Aug. 11, 1942.  A. LYSHOLM  2,292,384
HYDRAULIC POWER TRANSMISSION
Filed March 25, 1941  6 Sheets-Sheet 1
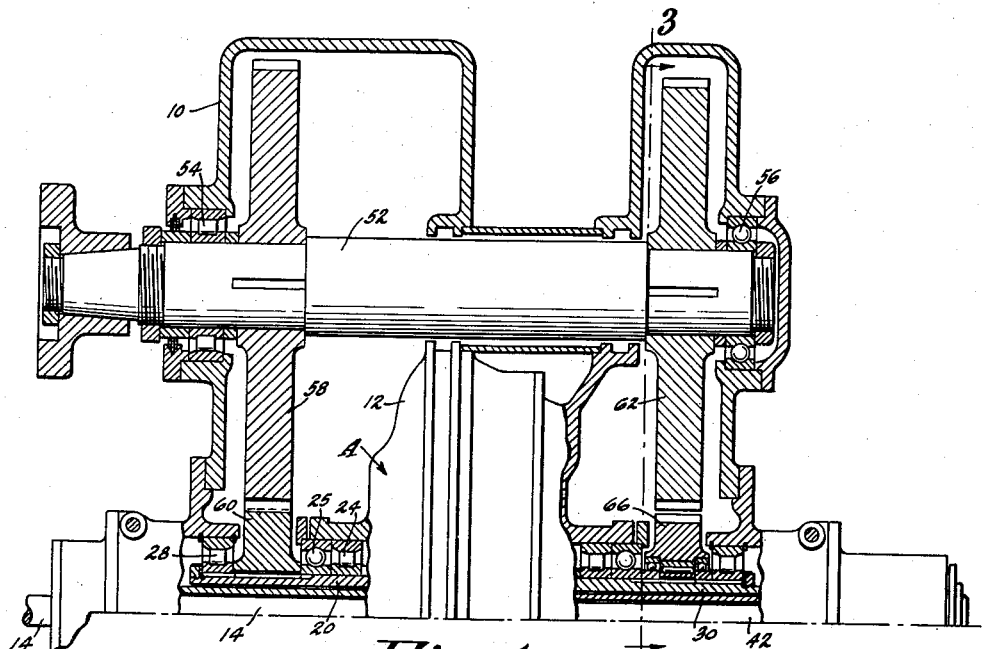
Fig. 1.
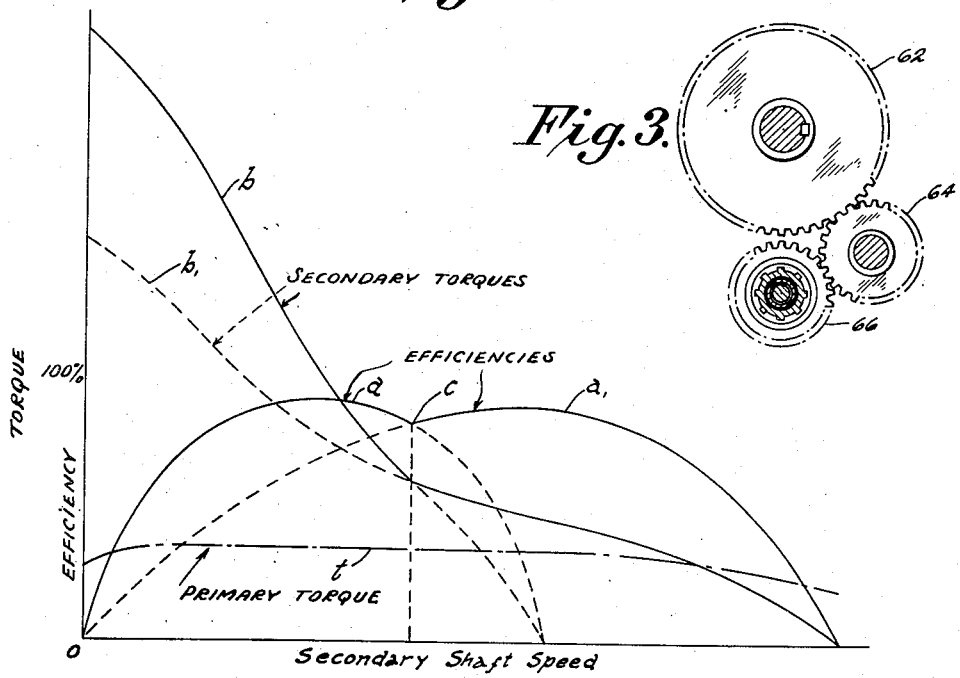
Fig. 2.
Fig. 3.
INVENTOR.
Alf Lysholm
BY
ATTORNEY.

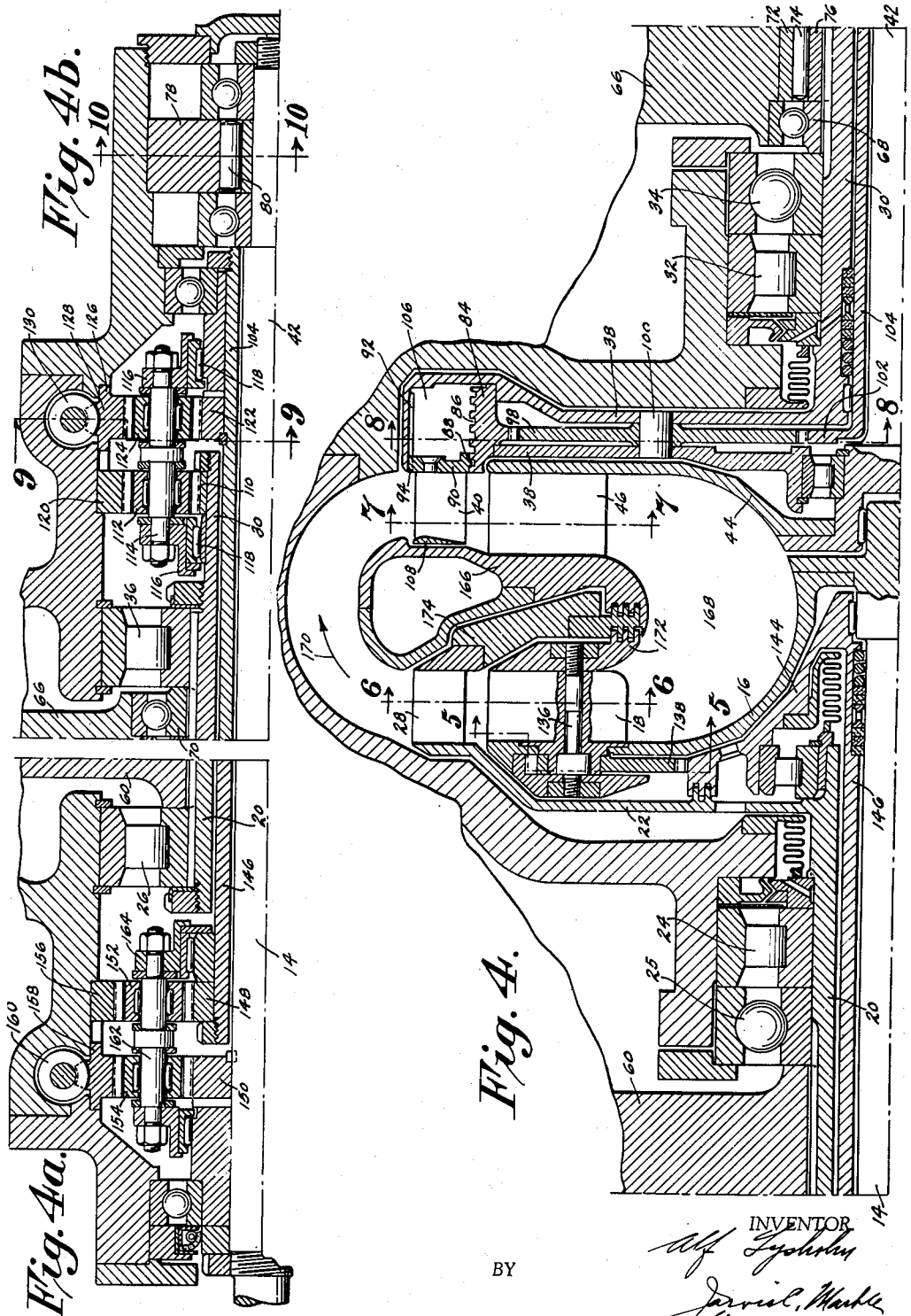

Aug. 11, 1942.  A. LYSHOLM  2,292,384
HYDRAULIC POWER TRANSMISSION
Filed March 25, 1941  6 Sheets-Sheet 3

INVENTOR.
Alf Lysholm
BY
his ATTORNEY.

Aug. 11, 1942.  A. LYSHOLM  2,292,384
HYDRAULIC POWER TRANSMISSION
Filed March 25, 1941  6 Sheets-Sheet 6
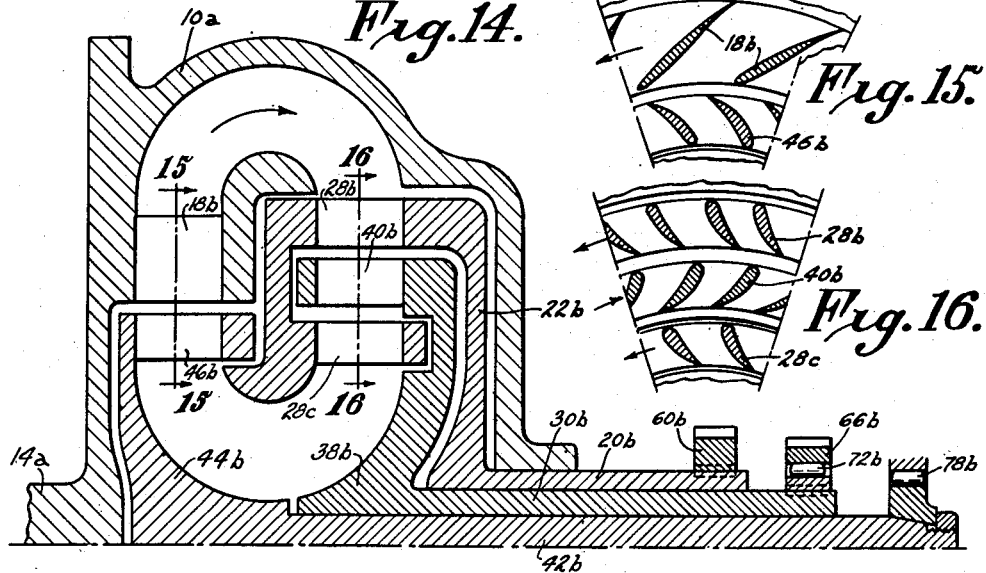
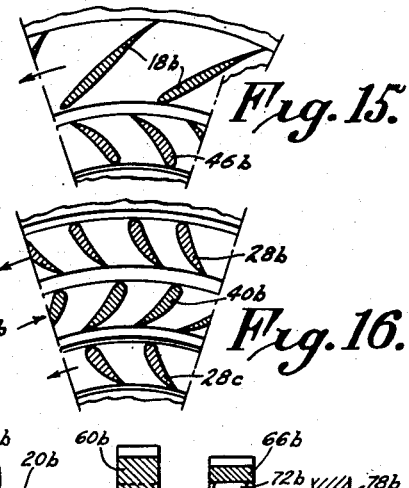
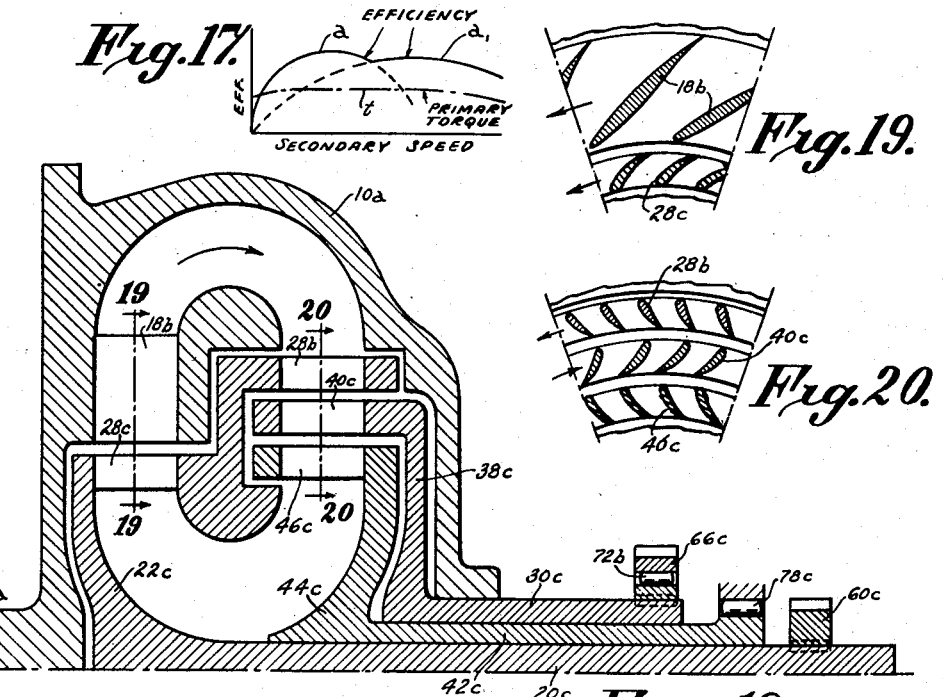
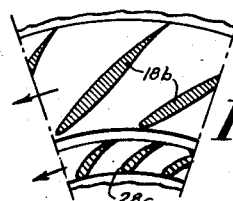
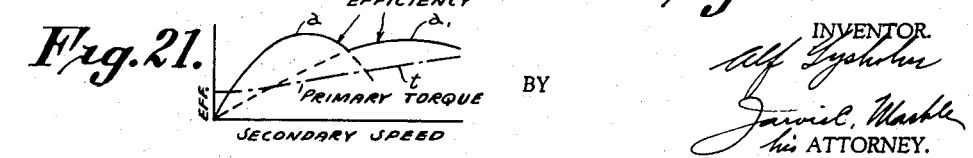
INVENTOR.
Alf Lysholm
BY
his ATTORNEY.

Patented Aug. 11, 1942

2,292,384

UNITED STATES PATENT OFFICE 2,292,384

HYDRAULIC POWER TRANSMISSION

Alf Lysholm, Stockholm, Sweden, assignor, by mesne assignments, to Jarvis C. Marble, Leslie M. Merrill, and Percy H. Batten, trustees Application March 25, 1941, Serial No. 385,047
In Germany August 1, 1936

30 Claims. (Cl. 60—54)

This application is a continuation-in-part consolidating and intended to replace my co-pending applications Serial No. 156,113, filed July 28, 1937, now abandoned, and Serial No. 314,769, filed January 20, 1940, and with respect to all common subject matter relates back thereto for all dates and rights incident to the filing thereof.

The present invention relates to hydraulic power transmissions and has particular reference to hydraulic torque multiplying converters of the kind in which pump and turbine members are mounted to operate in a working chamber in which fluid is circulated in a closed path of flow to transmit power from a driving to a driven element.

An object of the present invention is to provide an improved form of the above kind of apparatus capable of operating with relatively high efficiency over a wide range of relative speeds as between input and output members, capable of producing high ratios of maximum torque multiplication and further having torque absorbing characteristics suitable for taking the power output from prime movers of usual type, particularly internal combustion engines.

A further object of the invention is to provide improved transmission mechanism of the kind under consideration particularly suitable for use in drives applied for the propulsion of vehicles having a plurality of driving axles to which increased torque, as compared with input torque, is delivered by the transmission.

In order to achieve the above general objects and other and more detailed objects of the invention which will hereinafter more fully be pointed out, the invention contemplates the use of a plurality of turbine members arranged in the path of flow of the working fluid so that at least two rows of turbine blading through which the fluid flows consecutively, rotate in opposite directions to give what may be termed a double rotation effect, such turbine members being embodied in an organization such that a different number of effective turbine stages may be utilized under different operating conditions and the organizations being such that the transmission will operate as a torque multiplying device or torque converter with different numbers of effective turbine stages under different operating conditions.

To this end the invention contemplates a construction in which at least one of the turbine stages constituting a part of a double rotation combination may be rendered ineffective as a power transmitting means and may further, if desired, be removed from the path of flow of the working fluid in order to increase the efficency of the apparatus when such member is not being effectively employed as a power transmitting means, by reducing friction losses incident to the flow of the working fluid past the blades of such member.

More specifically, the invention contemplates the provision of a construction whereby the blading which when operating to transmit power rotates in a direction opposite that of the pump may be rendered ineffective, so as to change the character of operation from double rotation to single rotation. Still more specifically the invention contemplates the provision of a construction in which the change from double rotation to single rotation operation is made automatically and wholly in response to change in hydraulic conditions in the fluid circuit.

The invention in its several aspects is capable of embodiment in numerous different specific forms of apparatus and for a better understanding of the detailed nature of the invention, the manner in which its several objects are attained and the advantages to be derived from its use, reference may best be had to the ensuing portion of this specification in which several embodiments of the invention are described by way of example.

In the drawings forming a part hereof and illustrative of such embodiments:

Fig. 1 is a longitudinal section partly in elevation of a portion of a transmission embodying the invention;

Fig. 2 is a diagram illustrative of the efficiency and torque characteristics of the transmission illustrated in Fig. 1;

Fig. 3 is a section taken on the line 3—3 of Fig. 1;

Fig. 4 is a longitudinal half section on enlarged scale of the hydraulic apparatus shown in elevation in Fig. 1;

Fig. 4a is a section showing the left hand end portion of the apparatus, the central portion of which is shown in Fig. 4;

Fig. 4b is a section showing the right hand end portion of the apparatus the central portion of which is shown in Fig. 4;

Fig. 14 is a diagrammatic longitudinal half section showing a different example of hydraulic torque converter embodying certain principles of the invention;

Fig. 15 is a section taken on the line 15—15 of Fig. 14;

Fig. 16 is a section taken on the line 16—16 of Fig. 14;

Fig. 17 is a diagram similar to Fig. 2, showing the characteristics of the apparatus illustrated in Fig. 14;

Fig. 18 is a view similar to Fig. 14 showing still another example of apparatus embodying certain principles of the invention;

Fig. 19 is a section taken on the line 19—19 of Fig. 18;

Fig. 20 is a section taken on the line 20—20 of Fig. 18; and

Fig. 21 is a diagram similar to Figs. 2 and 17, showing the characteristics of the apparatus illustrated in Fig. 18.

Figure 6:
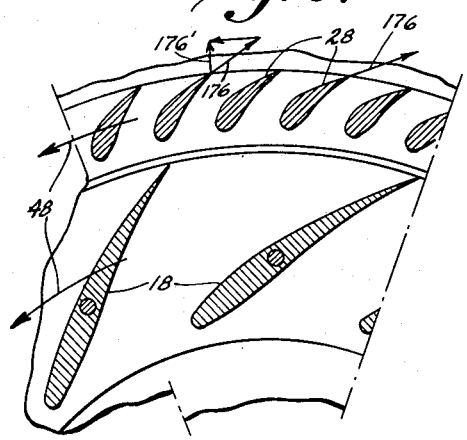
Fig. 6 is a section taken on the line 6—6 of Fig. 4.

Referring now to the form of apparatus illustrated in Figs. 1 to 10, inclusive, and having particular reference to Fig. 1, the apparatus comprises a main stationary casing structure 10 which includes a casing structure 12 for housing a hydraulic torque converter indicated generally at A.

The hydraulic torque converter includes a power input or pump shaft 14 to which is secured a pump member or wheel 16 (Fig. 4) carrying a row of pump blades 18. The converter further includes a hollow turbine shaft 20 carrying a turbine wheel 22, the hollow shaft or sleeve 20 being mounted in suitable bearings 24, 25, and 26 in the stationary casing structure, co-axially of the pump shaft 14. The turbine wheel 22 carries a row of turbine blades 28 located radially outwardly of the pump blades 18.

A second hollow turbine shaft 30 is mounted co-axially of the shaft 20 in bearings 32, 34 and 36 in the stationary casing structure and carries a turbine wheel 38 upon which is mounted a row of turbine blades 40, the mounting of which will hereinafter be more fully described.

The converter further is provided with a centrally located reaction shaft 42 which at its inner end carries a reaction wheel 44. Wheel 44 carries a ring of reaction guide blades 46.

As will be observed from Fig. 6, the pump blades 18 and the turbine blades 28 of the first turbine stage, which receives the discharge from the pump blades, are arranged so that the first turbine stage rotates in the same direction as the direction of rotation of the pump wheel. For the purpose of this description this direction, which is counterclockwise as viewed from the input end of the transmission, as indicated by arrows 48, may conveniently be considered to be forward direction. As will be observed from Fig. 7, the turbine blades 40 of the second turbine stage are arranged to rotate in clockwise or reverse direction as indicated by arrow 50.

In order for this to be effected, the blades 40 are set so that the angle of discharge therefrom has a peripheral component in counter-clockwise direction when the blades are stationary, that is, when the turbine wheel 38 is at stall.

Figure 7:
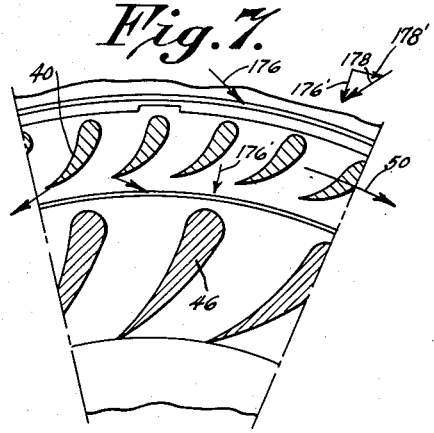
Fig. 7 is a section taken on the line 7—7 of Fig. 4.
Figure 5:
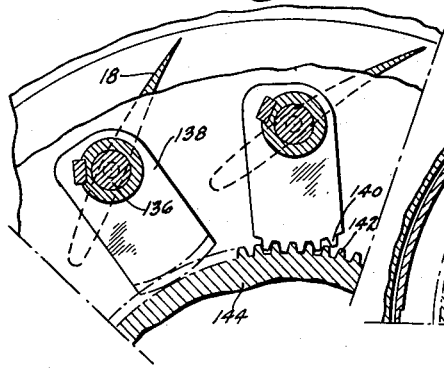
Fig. 5 is a section taken on the line 5—5 of Fig. 4.
Figure 8:
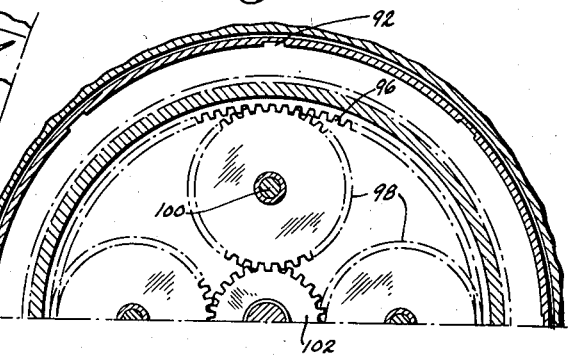
Fig. 8 is a section taken on the line 8—8 of Fig. 4.
Figure 9:
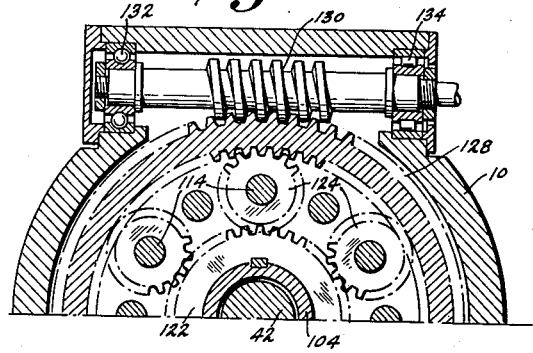
Fig. 9 is a section taken on the line 9—9 of Fig. 4b.
Figure 10:
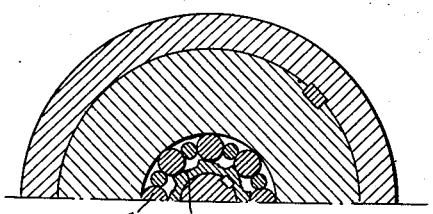
Fig. 10 is a section taken on the line 10—10 of Fig. 4b.

It is further particularly to be observed that in the present embodiment, as shown in Fig. 7, the guide blades 46 are also set in the same general manner as the turbine blades 40, that is, so that the discharge from the guide blades has a peripheral component in the same direction as that of the discharge from the turbine blades. The reason for this will appear later in this description.

In the present arrangement the oppositely rotating turbine shafts are connected to deliver power to a common output shaft 52 mounted in bearings 54 and 56 in the stationary casing structure. Shaft 52 carries a gear 58 meshing with gear 60 splined on turbine shaft 20. A second gear 62 fixed on the shaft 52 meshes with an idler pinion 64 (Fig. 3) which in turn meshes with gear 66. Gear 66 is carried by means of bearings 68 and 70 fixed on the turbine shaft 30 and between shaft 30 and gear 66 there is interposed an over-running or free wheel clutch 72 having rollers 74 coacting with cam surfaces 76 to provide a driving connection between the turbine shaft 30 and gear 66 when the latter tends to transmit power in the direction of arrow 50 (Fig. 7) and to permit the shaft 30 and with it the turbine wheel carrying the blades 40 to free wheel with respect to gear 66 under conditions hereinafter to be discussed.

The reaction shaft 42 is connected to the stationary casing structure by means of a one-way clutch or brake 78 (Figs. 4b and 10) having rollers 80 and cam surfaces 82, the latter being arranged to hold the reaction guide blades against rotation in clockwise direction as viewed in Fig. 7 and to permit them to turn in the same direction as the pump, that is, in counter-clockwise direction as viewed in this figure.

In the present embodiment, the second stage turbine blades 40 are also mounted so as to enable them to be withdrawn from the path of flow or circuit of the working fluid. To this end the turbine wheel 38 carries an adjusting ring 84 rotationally movable with respect to the wheel and having spiral grooves or threads 86 meshing with like threads 88 on the turbine ring 90 to which blades 40 are fixed. The turbine wheel further carries axially extending grooves 92 (Figs. 4 and 8) which receive the projections 94 on ring 90. Member 84 is provided with internal teeth 96 (Fig. 8) meshing with the teeth of a series of pinions 98 rotatably mounted on bearing pins 100 carried by the turbine wheel 38. Pinions 98 mesh with a central pinion 102 formed at the axially inner end of the adjusting sleeve 104 rotatably mounted between the hollow turbine shaft 30 and the central reaction shaft 42.

As will be apparent from Fig. 4, the second turbine stage including blades 40 may be withdrawn in axial direction from the working circuit into the recess 106 by turning the adjusting ring 84 relative to the turbine wheel 38, since the turbine ring is held against rotational movement with respect to the turbine wheel by the grooves and projections 92 and 94, and turning movement of the adjusting ring relative to the turbine ring will cause the spiral threads 86 and 88 to move the turbine ring axially to the right from the position shown in Fig. 4. The axially inner ends of blades 40 are preferably joined by a ring 108, which ring acts to substantially close communication between the main working chamber and the recess 106 when the turbine blades 40 are withdrawn from the circuit.

In order to effect adjustment of the position of the turbine blades 40, relative turning movement must be effected between the turbine wheel and the adjusting sleeve 104, both of which parts rotate under certain conditions of operation of the apparatus. In order to effect the desired adjustment, a planetary gear arrangement is advantageously employed and which will now be described, reference being had particularly to Figs. 4b and 9. The turbine shaft 30 has fixed thereto a gear 110 meshing with a series of planet pinions 112 mounted for rotation on planet spindles 114 mounted in a carrier 116 which is in turn rotatably carried by bearings 118. Pinions 112 mesh with the teeth of an internal gear 120 fixed in the stationary casing.

The adjusting sleeve 104 carries a gear 122 meshing with a second series of planet pinions 124 rotatably carried by the spindles 114. Pinions 124 mesh with the internal teeth of an annular gear 126 mounted for turning movement in the stationary casing part and having external worm teeth 128 meshing with a worm 130 transversely mounted in the casing structure in bearings 132 and 134.

Gears 110 and 122 are of like pitch diameter and the pitch diameter of the internal teeth on the gear members 120 and 126 are also of like diameter. Consequently, if both gears 126 and 120 are stationary, the adjusting sleeve 104 will be constrained to rotate at the same speed as the speed of the turbine shaft 30, both sets of planet pinions having like motion. The rate of rotation of the planet carrier is determined by movement of the turbine shaft 30 which through the pinions 112 is geared to the stationary gear 120. If now the gear 126 is turned by means of the worm 130, the adjusting sleeve 104 will be turned relative to turbine shaft 30 since the pinions 124 are carried by the spindles 114, the rate of rotation of which is fixed, and these pinions will act as transmitting members for changing the position of the sleeve 104 relative to sleeve 30 by an amount determined by the movement of gear 126 relative to the stationary gear 120. It will thus be evident that the position of the turbine blades 40 with respect to the circuit of the working fluid, that is, either in the circuit or out of the circuit is determined at any time regardless of whether the turbine member is rotating or not, by actuation of the adjusting worm 130.

In the present embodiment the pump blades 18 are pivotally adjustable to enable the area for flow of working fluid through the pump wheel to be altered, and if desired to enable the pump blades to be moved to a position providing a closed ring substantially preventing circulation of the working fluid in the apparatus. To this end the blades are pivotally mounted on pins 136 fixed in the pump wheel 16 and have fixed to the hub portions of the blades segments 138 (Fig. 5) the teeth 140 of which mesh with teeth 142 carried by a rotatably mounted adjusting disc 144 secured to an adjusting sleeve 146 mounted coaxially with and between the hollow turbine shaft 20 and pump shaft 14. As will be apparent from Fig. 5, turning movement of the adjusting disc 144 relative to the pump 116 will operate to cause the blades 118 to turn about their pivots and as will further be apparent from Fig. 5, such turning movement may be utilized to swing the pump blades to circumferentially extending positions so that the overlap of the blades provides a substantially closed ring which will operate to stop circulation of the working fluid except for the small amount that may leak past the closed blades. For turning the adjusting disc 144 relative to the pump shaft 14, planetary adjusting mechanism similar to that employed to turn the adjusting sleeve 104 relative to the shaft 30 may advantageously be employed. Such mechanism is illustrated in Fig. 4a, comprising gears 148 and 150 mounted on the adjusting shaft 146 and the pump shaft 14 respectively. Gear 148 meshes with planet pinions 152 while gear 150 meshes with planet pinions 154. Pinions 152 mesh with a stationary gear 156 and pinions 154 mesh with a rotatably mounted gear 158 which in turn meshes with an adjusting worm 160. The pinions 152 and 154 are carried by spindles 162 which are in turn mounted in a carrier 164. The operation of this planetary adjusting gear is evidently precisely the same as that of the adjusting gear previously described and it is believed its operation will be fully understood without further explanation.

Referring again to Fig. 4, it will be seen that the reaction or guide blades 46 serve as a bridge for supporting a central core member 166 which in part defines the annular chamber 168 through which the working fluid is circulated in the direction of arrow 170. It will further be noted that the pump blades 18 are carried between the main disc of the pump wheel 16 and a ring-like member 172 which is connected to the pump wheel by means of the pivot pins 136. The pump ring 172 extends radially inwardly to a place adjacent to the inlet edges of the pump blades. The turbine blades 28 are attached to a ring member 174 forming a part of the first stage turbine wheel, which member extends radially inwardly, between member 172 and the core member 166, to a point such that the first stage turbine wheel considered in its entirety substantially embraces the pump wheel assembly. This feature of construction is of some importance from an efficiency standpoint since it reduces the fluid friction losses in the system due to the fact that the relative rotation as between the pump wheel and the first stage turbine wheel, both of which rotate in the same direction, is less than between the pump wheel and a stationary or reversely rotating part.

The operation of the apparatus hereinbefore described, assuming the second stage turbine blades to be in the position shown in Fig. 4, is as follows, and it further being assumed that the driven shaft is stationary or at stall:

If under such conditions the pump shaft is rotated (the pump blades being assumed to be open) the working fluid in the chamber 168 is circulated by rotation of the pump wheel in the direction of the arrow 170 and acts to impose torque in opposite directions or senses upon the turbine blades 28 and 40. As the two turbine wheels begin to rotate in opposed directions under the influence of the energy derived from the working fluid, their torque is delivered unidirectionally to the output shaft 52 and since the two turbine wheels operate in opposite directions it will be evident that the rate of relative rotation between the two sets of blades will be double that which would be obtained under like conditions between a rotating turbine wheel and a set of stationary guide blades. The efficiency obtainable with turbine blades of the character under consideration is largely determined by the sum of squares of the relative blade speeds. With the reversely rotating turbine wheels this factor may be raised to a relatively high value with a relatively small number of stages operating at comparatively low absolute speeds of rotation of the turbine wheels, thus obtaining high stalling torque and high efficiency at low turbine shaft speeds. As a consequence, the efficiency curve rises much more rapidly than would be the case with a single rotation arrangement as the output or secondary shaft speed rises from the zero value corresponding to the stalled condition of this shaft. In an apparatus of the kind described, the efficiency curve of the transmission, with the double rotation stages in operation, is represented in Fig. 2 by the curve $a$ and the torque multiplication developed by the transmission is represented by the curve $b$. As will be seen from this figure, the characteristics provided by the double rotation turbine arrangement provide for high initial or starting torque and rapid rise of efficiency from zero value at stall to maximum value at relatively low secondary shaft speed. A further characteristic of this arrangement is, however, the relatively rapid drop of efficiency as the secondary shaft speed increases and from this it is evident that an arrangement of this kind is capable of operation at relatively high efficiency only through a restricted low speed range of the secondary or output shaft.

On the other hand, if the double rotation effect is dispensed with and the apparatus is operated as a single rotation converter, the efficiency characteristic is of the order represented by the curve $a_1$ in Fig. 2 which it will be noted provides a much more gradual rise in the efficiency of operation as the secondary shaft speed increases from stall. The torque characteristics, under single rotation operation are represented by the curve $b_1$.

With apparatus of the kind under consideration it will be evident that the characteristics of both single and double rotation may readily be availed of by permitting the second or reversely rotating turbine wheel to become ineffective. In accordance with one phase of operation of the present apparatus, this is effectively accomplished by manipulation of the adjusting worm 130 to cause relative rotation of the adjusting member 84 with respect to the reversely rotating turbine wheel 38, thus withdrawing the reversely rotating turbine blades 40 from the path of flow of the working fluid. When these blades are thus withdrawn into the recess 106, the ring 108 serves to present a substantially smooth wall for guiding the working fluid, and losses due to friction, eddy currents, etc. are substantially reduced. However, an appreciable loss may occur with the blades 40 retracted due to so-called windage losses and for the purpose of increasing the efficiency of operation, the overrunning clutch 72 comes into operation to permit the reversely rotating turbine wheel to float after the blades 40 are withdrawn from the circuit, thus reducing losses to a minimum.

From a consideration of the efficiency and torque curves of Fig. 2 it will be apparent that for propulsion purposes, particularly where it is desired to transmit power from an engine to one or more driving axles that may start from rest and which it may be desired to accelerate to relatively high speeds, the arrangement described is highly useful since very high starting torque is obtainable and high efficiency of operation may be reached shortly after starting. Thereafter as the speed of the driven end of the apparatus increases to a degree where the efficiency of operation of the double rotation unit materially falls off, the reversely rotating turbine wheel may be rendered ineffective and advantage taken of the high efficiency of the single rotation unit in the speed range where the driven shaft speed more nearly approaches the input shaft speed.

With such an arrangement, high efficiency and at the same time adequate torque characteristics may be made available over a very wide range of speed of the secondary shaft relative to that of the input shaft.

It is important, however, to note that in an apparatus of this character satisfactory operation for the purpose of accelerating and operating a vehicle requires that when the apparatus shifts from operation as a double rotation converter to single rotation operation, it should still function as a converter capable of multiplying torque and not merely as a hydraulic coupling. The reason for this is that ordinarily a transmission unit must be so geared to the vehicle or other apparatus which it drives that torque multiplication is still required for accelerating purposes at the vehicle or other driven shaft speed which makes it desirable, on account of efficiency charcteristics, for the apparatus to change from double rotation to single rotation operation.

Obviously, if the device is to be operable as a single rotation converter (with the reversely rotating turbine blades withdrawn from the circuit or otherwise inoperative to absorb torque) other torque absorbing blades must be provided to absorb the difference between the input and output torques. In the present device the blades 46 perform this function when the device operates as a single rotation converter, but in addition to this the blades 46 also have a highly important function when the device operates as a double rotation converter. This latter function is that of guiding the flow of working fluid into the pump in order to secure practically desirable torque absorbing characteristics of the pump.

In order to better understand the practical necessity of having the guides 46 in the double rotation converter, we may best compare the action of single and double rotating turbine blade systems as they affect the torque absorbing characteristics of the pump. In a single rotation converter of the kind in which turbine blades discharge directly to the pump, the pump receives working fluid discharged from blades rotating in the same direction as the pump. With this relation the change in direction of flow of the fluid entering the pump, with change in turbine speed relative to pump speed, is such that the pump is increasingly "loaded" as the turbine speed decreases toward the condition of stall. Therefore, with the single rotation type of device the pump is capable of absorbing the maximum amount of torque when the driven shaft is at stall, the condition to be desired. In a double rotation converter in which the reversely rotating turbine blades discharge to the pump, as for example in Fichtner U. S. Patent No. 2,145,005, the converse holds, and as the turbine blade speed is reduced compared with pump speed, the pump is progressively "unloaded." Therefore in this latter type of device the torque absorbing characteristic of the pump is exactly opposite what is desired, since at starting or under load sufficient to cause low turbine speed, the pump is incapable of absorbing the desired amount of input torque from the prime mover. In other words the more the output shaft is loaded, the more the motor tends to race.

In accordance with the present construction, the above undesirable pump characteristic with double rotation operation is eliminated by the provision of the guide blades 46, which serve to guide and direct the working fluid into the pump wheel at a constant entrance angle regardless of the speed of the turbine wheels. With such an arrangement, adequate loading of the pump wheel at stall and a satisfactory torque absorbing characteristic are readily obtainable.

In the arrangement shown in Fig. 4 it will be seen that in the course of its flow through the circuit the working fluid after leaving the pump passes both the first and second stages of the turbine blading and then passes through the guide blades before returning to the pump, when the apparatus operates as a double rotation converted, and when operating as a single rotation converter, passes through guide blades 46 after leaving turbine blades 28 before returning to the pump blades. Thus, it may be said that working fluid passes through the pump blades, the double rotating turbine blades and guide blades in the order named under both double rotating and single rotating operating conditions. Due to the presence of the guide blades the apparatus thus is capable of operating as a torque converter rather than merely as a fluid coupling, under both conditions of operation.

As will be observed from Fig. 2, as the secondary shaft speed approaches that of the input shaft speed, with the apparatus operating as a single rotation converted, the torque curve $b_1$ falls toward zero value and when the secondary shaft speed reaches a value such that the torque is reduced to 1:1 ratio, it will be evident that the apparatus may, if desired, be operated as a fluid coupling for the remainder of the speed range of the secondary shaft represented by the difference between the secondary shaft speed when 1:1 torque ratio is reached and the closest approach to input shaft speed that it is possible for the secondary shaft to attain. Operation of the apparatus as a coupling in the portion of the speed range of the secondary shaft which lies between the speed at which 1:1 torque ratio is attained and maximum secondary shaft speed is possible only when less than maximum input torque is delivered to the apparatus but in spite of this limitation certain operating conditions may make operation as a coupling desirable in the high speed range of operation of the secondary shaft. In order to permit operation as a coupling to be accomplished if desired, the free wheel clutch 78 is advantageously provided between the reaction shaft 42 and the casing, so that under conditions of operation where the secondary shaft speed is at or above that corresponding to 1:1 torque ratio, the reaction blades may rotate in the same direction as the pump and thus provide in effect a two element coupling.

While the change of operation from double rotation to single rotation has been described as accomplished by withdrawal of the reversely operating turbine blades from the fluid circuit, it is not essential to withdraw the reversely rotating blades from the circuit in order to accomplish the desired results.

It has been found that in instances where the turbine blading has a highly efficient profile for variable speed operation, such for example as is possessed by blading embodying the invention set forth in Reissue Patent No. 18,485, granted to me May 31, 1932, the reversely rotating turbine blading may be permitted to remain in the circuit at all times without so reducing the efficiency of the single rotation operation as to render such operation unsuitable from a practical standpoint. It will be appreciated, however, that retraction of the reversely rotating turbine blading from the circuit under conditions of single rotating operation will result in obtaining higher maximum efficiency under single rotating operating conditions because of smaller friction and eddy losses.

In the embodiment of the invention which has been described, single rotation operation of the converter without withdrawal of the reversely rotating blades 40 is automatically provided for by the over-running or free wheel clutch 72 between the reversely rotating turbine shaft 30 and its associated gear 56.

In order to understand the action automatically provided by this clutch, let it be assumed that the apparatus is started from a condition of stall of the secondary shaft, with the reversely rotating blades 40 in the circuit. At stall, the relative positions of blades 28 and 40 is such that the fluid enters the row of blades 40 in the direction of the arrow 176 (Figs. 6 and 7). As the two turbine wheels turn relative to each other, upon acceleration of the secondary shaft, the absolute angle of the fluid leaving blades 28 and entering blades 40 swings to a position such for example as that shown at 176', owing to the peripheral velocity component introduced by the turning of the wheel carrying blades 28. At the same time, however, due to the fact that blades 40 are turning in a direction opposite to the direction in which blades 28 are turning, the absolute velocity 176' produces a relative inlet velocity to blades 40 having a direction as indicated at 178. As the velocity component 178' produced by movement of blades 40 increases with increase in turbine speed the relative inlet velocity reaches a so-called "racing" condition, that is, a condition under which the fluid flows through blades 40 without producing torque on the turbine wheel. This condition corresponds to point c on the diagram of Fig. 2. With this condition obtaining, the freewheel clutch 72 comes into action, permitting blades 40 to float in the circuit, and the converter goes over automatically to single rotation operation.

With single rotation operation, the guide blades 46 take up the difference between input and output torque, and it is to be noted that at the time of changeover from double to single rotation operation, with blades 40 "floating," the absolute inlet angle of entrance of the fluid to blades 46 is 176', the same as to blades 40, since there is no appreciable deflection of the fluid due to its passage through the floating blade row. In the case of blades 46, however, the absolute and relative inlet angles are the same, since these blades are stationary. Consequently, for blades 46 to take up the desired reaction torque as well as provide the desired guiding to the pump inlet, these blades are ordinarily inclined, as shown in Fig. 7, in the same direction as the immediately preceding row of reversely rotating blades 40. With the guide blades 46 inclined in the same direction as the reversely rotating blades 40, it might appear that the same undesirable "unloaded" characteristic of the pump would occur as with the condition of stall of the turbine member in the case of a reversely rotating turbine. Such, however, is not the case, since with the guide blades 46 delivering to the pump at a constant discharge angle under all conditions of operation, the pump blades can readily be designed to give the desired loading of the pump with the given angle of guide blade discharge. In the case of delivery from reversely rotating turbine blades to the pump, the unsatisfactory pump loading is occasioned by the manner in which the discharge angle from the turbine blading to the pump varies with variations in turbine speed. In the latter case, if the pump is designed to be properly loaded when taking the discharge from a stalled turbine wheel, then the pump will be overloaded when the turbine wheel is running. Similarly, if the pump is designed to be properly loaded when receiving the discharge from a reversely running turbine wheel, it will be undesirably unloaded when the turbine wheel is at stall, as previously explained. Inclination is, however, not essential in all cases, since for certain specific design characteristics, the difference in velocity angles at different speeds may be such that substantially radial guide blades may be desirable.

The only difference in operation with the reversely rotating blades in the circuit but connected to the driven shaft through an over-running clutch, as compared with these blades being withdrawn from the circuit, is represented by the resistance to flow of the working fluid through these blades when ineffective as compared with the condition in which these blades are wholly withdrawn from the circuit. This difference is reflected in the maximum efficiency obtainable with single rotation operation of the converter and in instances where maximum efficiency in single rotation operation is of less importance than simplicity of the apparatus, it will be evident that the mechanism for withdrawing reversely rotating blades from the fluid circuit may be dispensed with since if such mechanism is omitted the structure will obviously be simplified and cheaper of construction. It will be understood that for those cases where operation of the apparatus as a single rotation converter without actually withdrawing the reversely rotating blades from the circuit is contemplated, special consideration should be given to the profile of the blading of the reversely rotating wheel, such blading advantageously being of as thin section as practical without sacrifice of efficiency characteristics.

In the preceding discussion of the characteristics of operation of the apparatus it has been assumed that the input shaft speed is maintained constant. The torque absorbing characteristics of a converter of the kind described are such that the input torque will ordinarily be substantially constant as indicated by the line $t$ of Fig. 2. Other torque absorbing characteristics may, however, be provided as will hereinafter more fully be pointed out.

The adjustable pump blades 18 may, as previously pointed out, be utilized to alter or if desired substantially entirely shut off the flow of working fluid through the apparatus so that it may be employed between a source of power such as an internal combustion engine, which it may be desired to operate continuously, and a driven member such as the axle of a vehicle which at times must be stationary while the engine is running, without the necessity for an additional clutch in the line of power transmission.

Figure 11:
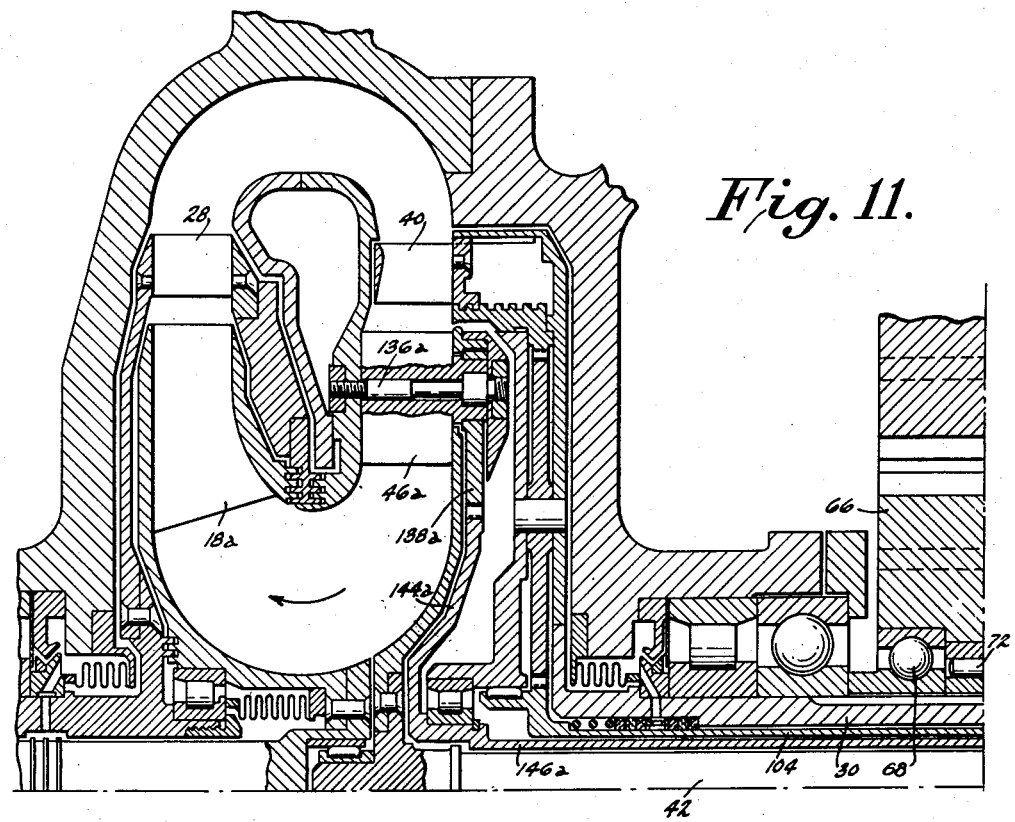
Fig. 11 is a section similar to Fig. 4 showing a somewhat different arrangement of hydraulic parts for a transmission organization such for example as shown in Fig. 1.
Figure 11A:
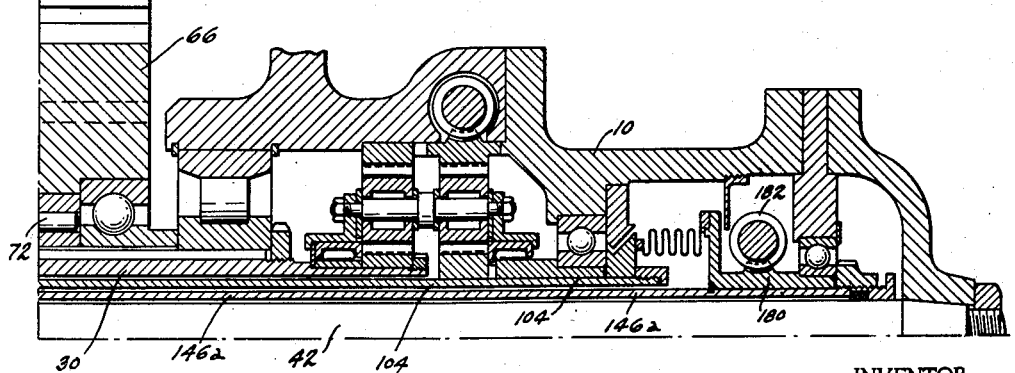
Fig. 11a is a section showing the right hand end of the apparatus the central portion of which is shown in Fig. 11.

In Figs. 11 and 11a a variation of the arrangement shown in Figs. 1 to 10 is illustrated, the principal difference between this arrangement and the arrangement shown in the previously described embodiment being that in the present arrangement the pump blades 18a are fixed rather than adjustable while the guide blades 46a are made adjustable instead of fixed as in the previous embodiments. The general construction is similar to that previously described and like parts are correspondingly numbered. It is accordingly not necessary to describe those portions of the apparatus similar to those previously described. In the present instance the guide blades 46a are mounted to turn about pins 136a, similar to the pump pivot pins of Fig. 4 and having attached to them the segments 138a similar to those shown in Fig. 5. These segments mesh with an adjusting disc 144a which is attached to an adjusting sleeve 146a, which in this instance may be interposed between the reaction shaft 42 and the adjusting sleeve 104 which operates to retract the reversely rotating blades. As will be observed from Fig. 11a, the adjusting sleeve 146a extends beyond the sleeve 104 and at its outer end has fixed thereto a worm wheel 180 meshing with the transversely positioned worm 182. Adjusting movement of the latter will operate to turn the adjusting sleeve 146a relative to the reaction shaft 42. In this embodiment the over-running clutch between the reaction shaft and the stationary casing has been omitted but it will be evident that if it is desired to make use of the present embodiment as a hydraulic coupling, an over-running clutch may be interposed between the reaction assembly and the casing so as to enable the reaction blading to rotate under conditions when the torque ratio through the apparatus is 1:1 or less.

As in the preceding embodiment, the over-running clutch 72 is advantageously provided by the reversely rotating turbine shaft 30 and its associated gear 66.

In the present embodiment, the adjustable guide blades 46a provide a convenient means for altering at will the torque absorbing characteristic of the pump by changing the entrance angle of the fluid delivered to the pump, regardless of driven shaft speed or momentary condition of operation, that is, as a double rotation or single rotation converter. Also, the adjustable guide blades may be arranged to be fully closed, thus providing means for shutting off flow of fluid through the circuit in a way similar to that afforded by the adjustable pump blades of the form shown in Fig. 4.

Figure 12:
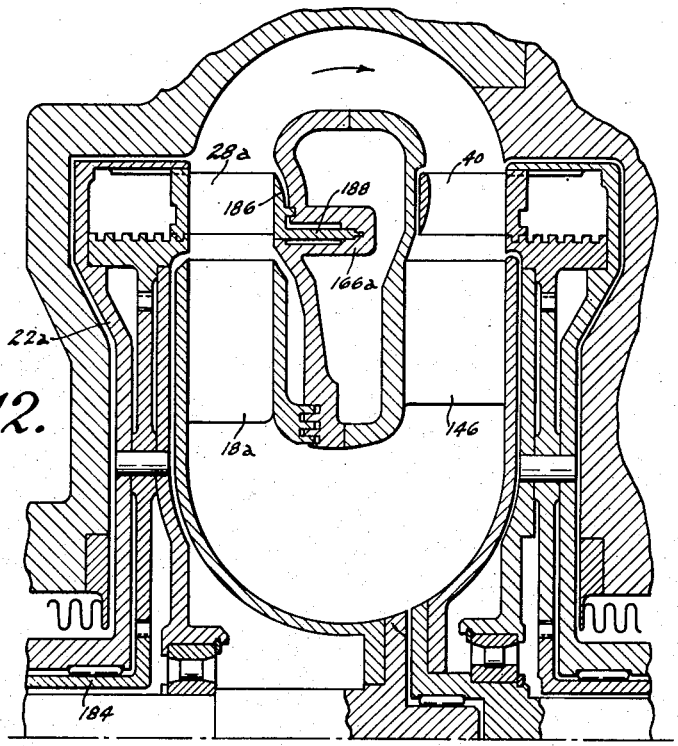
Fig. 12 is a view similar to Figs. 4 and 11 showing still another form of hydraulic apparatus.

Still another arrangement is illustrated in Fig. 12, in which arrangement fixed pump blades 18a and fixed guide blades 146 are employed. In this arrangement, however, the turbine blades 28a of the forwardly rotating turbine wheel are made retractable as well as the reversely rotating blades 40. The construction employed for retracting the blades 40 is similar to that previously described and need not again be described in detail and blades 28a are made retractable by similar mechanism including an adjusting sleeve 184 associated with the turbine wheel 22a, the operation of which to retract the blades will be understood from the previous description.

In the present embodiment, the blade ring 186, to which the axially inner ends of the turbine blades 28a are attached, is provided with an axially extending ring-like flange 188, which flange is in a recess in the central core structure 166a when the blades 28a are in the fluid circuit. As will be evident from the figure, the flange 188 will act as a blocking ring for stopping fluid circulation through the apparatus when the blades 28a of the first turbine stage are withdrawn from the circuit.

It will be understood that in this embodiment changeover from double rotation to single rotation operation may likewise be effected by retraction of and/or freewheeling of blades 40, and guide blades 146 may evidently be connected to the housing through a freewheel clutch if desired. The means for accomplishing these functions may be like those shown in Fig. 4b. By withdrawing blades 28a from the circuit, the pump may be unloaded due to stoppage of circulation, and this function can also be obtained by omitting the closing ring 188, withdrawing both blades 28a and 40 and freewheeling the guide blades 146. Withdrawal of blades 28a from the circuit may also be accomplished by gearing of the kind shown in Fig. 4a or Fig. 4b, applied to produce relative rotation between parts 22a and 184. In such case the fluid will be circulated idly by the pump, with substantially no drag torque on the secondary shaft.

Figure 13:
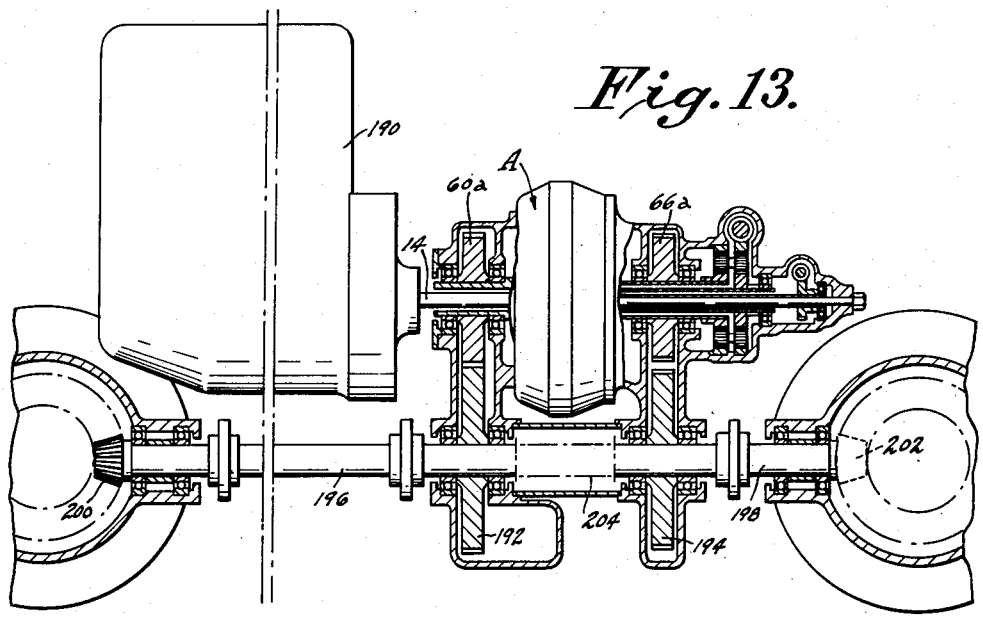
Fig. 13 is a more or less diagrammatic view showing a hydraulic transmission embodying the invention applied to a vehicle having a plurality of driving axles.

In Fig. 13 there is illustrated an application of a transmission embodying the principles of the invention, to a vehicle having multiple driving axles.

In this arrangement a motor is indicated at 190 which delivers to the input shaft 14 of a double rotation converter, the hydraulic blading of which may be in accordance with any one of several modifications embodying the principles of the invention.

For purposes of illustration, the converter A is indicated in Fig. 13 as being of the kind illustrated in Figs. 11 and 11a with oppositely rotating turbine shaft gears 60a and 66a being connected to counter shaft gears 192 and 194 respectively, gear 60a meshing directly with gear 192 while gear 66a transmits power through gear 194 to the idler gear (not shown). The counter shaft gears 192 and 194 are mounted on shafts 196 and 198 respectively and these shafts are in turn connected through suitable flexible couplings and bevel gears 200 and 202 to independently driven vehicle driving axles.

As will be evident from the arrangement described, each of the reversely rotating turbine wheels operates to separately drive a different one of the axles of the vehicle, and with this arrangement power may be applied to both axles from the reversely operating turbine wheels through the speed range in which double rotation effect is employed, without the necessity for the use of a differential. Since the reversely rotating turbine wheels are not positively connected within the hydraulic apparatus they may, if one of the sets of driving wheels is of slightly larger diameter than the other, accommodate their absolute speeds of rotation to compensate for any such differences. With this arrangement, when the vehicle is accelerated to a speed such that single rotation operation becomes desirable, the reversely rotating turbine blades may either be withdrawn from the circuit or permitted to become inactive through the operation of an over-running clutch, in which event the drive through the transmission will be transmitted to only one of the driving axles through the shaft 196 connected to the forwardly rotating turbine wheel. This provides an entirely satisfactory type of drive since under conditions when single rotation operation is desired, the output torque will be relatively low as compared with starting torque and the adhesion provided by one set of vehicle driving wheels will be sufficient.

Under some emergency conditions it may be desirable to be able to transmit power positively to both sets of driving wheels and in such case any suitable form of connection such as is diagrammatically indicated at 204 may be provided between the shafts 196 and 198, thus producing a single output shaft type of apparatus such as is illustrated in Fig. 1 wherein the two turbine wheels deliver power to a common output shaft.

In all of the previously described embodiments the hydraulic arrangement has been embodied in a stationary casing structure and the turbine shafts have extended from the opposite ends of such structure. It is not necessary, however, for the principles of the invention to be limited to this type of structure and in Figs. 14 to 21, different embodiments are more or less diagrammatically illustrated in which rotating casing structure is employed and in which both turbine shafts project from the same axial end of the apparatus. Also, the previously described embodiments show only one forwardly and one reversely rotating turbine stage. In cases where very high torque multiplication may be required, more stages are desirable and this may readily be accomplished with structures embodying the principles of the present invention, as shown in the further embodiments now to be described.

Referring now to Figs. 14 to 17, inclusive, the input shaft 14a is directly connected to a rotating casing structure 10a which carries the pump blades 18b. The first or forwardly rotating stage of turbine blades 28b is carried by the turbine wheel 22b connected to the hollow turbine shaft 20b. Shaft 20b has fixed thereto any suitable means for taking off power, illustrated in the present embodiment as gear 60b.

The reaction shaft 42b carries the reaction wheel 44b having a row of reaction or guide blades 46b, which in this instance are located immediately ahead of the pump blades in the fluid circuit rather than immediately behind the turbine blades as in the forms previously described. The reaction shaft may be connected through the medium of a one-way brake or clutch 78b to any suitable stationary abutment member, although it will be understood that if desired this clutch may be omitted.

The reversely rotating turbine wheel 38b carries blades 40b and the hollow shaft 30b for this wheel extends axially from the same end of the casing as that of the forward turbine shaft 20b. Advantageously, the reversely rotating turbine shaft 30b is connected to its output member, shown as gear 66b, through the medium of an over-running clutch 72b.

In the present instance the forwardly rotating turbine wheel is provided with a second stage of blading consisting of blade ring 28c and as will be apparent from the figure, the flow of the working fluid after leaving the pump blades is first through a forwardly rotating turbine stage, then a reversely rotating stage, and again through forwardly rotating blading before passing through the guide blades which deliver the fluid to the pump wheel.

With this embodiment, the characteristic quick rise in efficiency upon acceleration from stall is not only retained but accentuated by the duplication of the double rotation effect secured through the use of only one additional stage of blading. Further, this duplication of the double rotation effect enables a very high maximum torque multiplication, of the order of ten to one or better, to be very easily obtained with comparatively few stages of blading.

In the embodiment just described, a guide blade wheel is used in order to enable the structure to function as a single rotation device in the high secondary speed range, and with the guide blades placed on the inlet side of the pump wheel, the same torque absorbing characteristic for the pump will be obtained as in the previously described embodiments, regardless of the fact that in the present instance the working fluid is received by the guide blades from a forwardly rather than a reversely rotating turbine wheel. The reason for this is the same as that previously discussed in connection with the modification illustrated in Fig. 4 and related figures, since in this case also the angle of discharge to the pump is a constant and the pump blades can readily be designed for the desired pump loading with the given angle of discharge to the pump. In Fig. 17, the nature of the characteristic curves is illustrated.

In some instances it may be desirable to have the characteristic of "loading" of the pump at stall, and in accordance with the present invention this also may be readily accomplished without material sacrifice of other desirable operating characteristics. In the embodiment shown in Figs. 18 to 21, an arrangement giving the pump loading characteristics typical of a single rotation converter is shown. In this arrangement the forwardly rotating turbine wheel 22c is carried by a central shaft 20c delivering power, for example, through gear 60c, and carries a first stage of blading 28b and a second stage of turbine blading 28c, the latter being located adjacent the inlet of the row of pump blades 18b.

The reversely rotating turbine wheel 38c carries blades 40c and is connected to shaft 30c which, as in the embodiment previously described, is advantageously connected to its power output gear or like member 66c through the medium of an over-running clutch 72b.

The reaction wheel 44c in this instance is connected to a hollow reaction shaft 42c and may be connected to any suitable fixed abutment through the medium of a one-way brake or clutch 78c.

As will be observed from Fig. 18, the flow of the working fluid after leaving the pump blades 18b is first through a forwardly rotating stage of turbine blades, next a reversely rotating stage, and then through a stage of fixed guide blades 46c, the sequence of pump, turbine and guide blades thus being the same as in the embodiments shown in Figs. 4, 11, and 12. In the present instance, however, the working fluid after leaving the guide blades passes through an additional stage of forwardly rotating turbine blades 28c before entering the inlet of the pump.

With the blading arranged in this order, and with the same number of blade rows used in the embodiment shown in Fig. 17, there is obtained a double rotation effect between blades 28b and 40c, a single rotation effect between blades 40c and 46c and a second single rotation effect between blades 40c and 28c. These effects, cumulatively, give slightly less maximum torque multiplication and not quite such a rapid rise in efficiency upon acceleration from stall as in the arrangement of Fig. 17, but the values for these characteristics are nevertheless very good and in addition there is obtained the characteristic of a loaded pump because of the fact that the pump receives fluid discharged from a turbine wheel turning in the same direction as the pump. These characteristics are indicated in the diagram of Fig. 21. Claims directed to the specific blade arrangement of the modification shown in Fig. 18 and associated figures hereof form the subject matter of my co-pending application Serial No. 314,769, with respect to which the present application is a continuation-in-part as to a portion of its subject matter.

What is claimed is:

1. A hydraulic torque transmitter of the closed circuit type including in the working circuit pump means, forwardly rotating turbine means constructed to rotate in the same direction as the pump, reversely rotating turbine means constructed to rotate in a direction opposite that of the pump, and guide blade means located in said circuit to be passed by the working fluid after leaving said reversely rotating turbine means and before entering said pump means, said reversely rotating turbine means being constructed to be rendered ineffective as a torque transmitting means due to the action of the working fluid thereon when the relative speed between said forwardly rotating turbine means and said reversely rotating turbine means reaches a given value, whereby to cause said transmitter to operate as a double rotation torque converter when said relative speed is below said given value and to automatically change to operate as a single rotation torque converter when said given value is exceeded.

2. A hydraulic torque transmitter of the closed circuit type including in the working circuit pump means, forwardly rotating turbine means constructed to rotate in the same direction as the pump, reversely rotating turbine means constructed to rotate in a direction opposite that of the pump, and guide blade means located in said circuit to be passed by the working fluid after leaving said reversely rotating turbine means and before entering said pump means, said reversely rotating turbine means being constructed to be withdrawn from said working circuit to change the operation of said transmitter from that of a double rotation converter to that of a single rotation converter.

3. A hydraulic torque transmitter of the closed circuit type including in the working circuit pump means, forwardly rotating turbine means constructed to rotate in the same direction as the pump, reversely rotating turbine means constructed to rotate in a direction opposite that of the pump, and guide blade means located in said circuit to be passed by the working fluid after leaving said reversely rotating turbine means and before entering said pump means, means associated with said reversely rotating turbine means for rendering the same ineffective as a torque transmitting means and means associated with said guide blade means for rendering the same ineffective as a torque absorbing means, whereby to permit said torque transmitter to change from operation as a double rotation converter to operation as a single rotation converter and to change from operation as a single rotation converter to operation as a hydraulic coupling.

4. A hydraulic torque transmitter of the closed circuit type including in the working circuit pump means, forwardly rotating turbine means constructed to rotate in the same direction as the pump, reversely rotating turbine means constructed to rotate in a direction opposite that of the pump, and guide blade means located in said circuit to be passed by the working fluid after leaving said reversely rotating turbine means and before entering said pump means, said reversely rotating turbine means being constructed to be rendered ineffective as a torque transmitting means due the action of the working fluid thereon when the relative speed between said forwardly rotating turbine means and said reversely rotating turbine means reaches a given value and said guide blade means being constructed to be rendered ineffective as a torque absorbing means by the action of the working fluid thereon when the relative speed between said pump means and said forwardly rotating turbine means decreases to a value productive of a torque ratio through the transmitter of no more than 1:1, whereby to cause said transmitter to change automatically from operation as a double rotation converter to operation as a single rotation converter when said first mentioned given value is reached and to change automatically from operation as a single rotation converter to operation as a hydraulic coupling when said second mentioned value is reached.

5. A hydraulic torque transmitter of the closed circuit type including in the working circuit pump means, forwardly rotating turbine means constructed to rotate in the same direction as the pump, reversely rotating turbine means constructed to rotate in a direction opposite that of the pump, and guide blade means located in said circuit to be passed by the working fluid after leaving said reversely rotating turbine means and before entering said pump means, said reversely rotating turbine means being constructed to be withdrawn from said working circuit and said guide blade means being constructed to be restrained against movement in the direction opposite that of the pump means and to be freely rotatable in the same direction as that of the pump means, whereby to permit operation of said transmitter to be changed from that of a double rotation converter to that of a single rotation converter by withdrawal of said reversely rotating turbine means from said working circuit and to change automatically from operation as a single rotation converter to operation as a hydraulic coupling due to the action of the working fluid on said guide blade means when the relative speed between said pump means and said forwardly rotating turbine means decreases to a value corresponding to 1:1 torque transmission through the device.

6. A torque multiplying hydraulic converter including pump means, turbine means providing separate turbine stages constructed to rotate in opposed directions and guide blade means, all of said means being located in a common working chamber in which the working liquid is circulated by the pump means in a closed path of flow, and means associated with said turbine means for varying the number of turbine stages effectively acted upon by the liquid during its flow through said path to change the operation of the converter from double rotation operation to single rotation operation.

7. A torque multiplying hydraulic converter including pump means, turbine means providing separate turbine stages constructed to rotate in opposed directions and guide blade means, all of said means being located in a common working chamber in which the working liquid is circulated by the pump means in a closed path of flow, the turbine means constructed to rotate in a direction opposite that of the pump means being mounted to have movement laterally of said path, and means for withdrawing the last mentioned turbine means from said path to change the operation of the converter from double rotation operation to single rotation operation.

8. A hydraulic torque converter of the kind in which working liquid is circulated in a closed path of flow including a pump for circulating the liquid, two separate turbine members having blading arranged to be acted on by the working liquid to rotate the first of said members in the same direction as the pump and the second of said members in the opposite direction, and a guide blade member for guiding the liquid entering said pump, the second of said turbine members having the blading thereon shiftably mounted to be withdrawn at will from said path of flow to change operation of the converter from double rotation to single rotation operation.

9. A hydraulic power transmitter of the kind in which working liquid is circulated in a closed path of flow including a pump having an impeller for circulating the working liquid, a power input element for driving said pump, two turbine members each having a power output element associated therewith, said turbine members being bladed to deliver power to their respectively associated output elements in opposite directions of rotation, a guide blade member restrained against rotation in a direction opposite that of the impeller and having blades located to be passed by the working liquid after it leaves the turbine blading constructed to rotate in a direction opposite that of the pump and before entering the inlet of said impeller, and an automatically releasable one-way driving connection between one of said turbine members and its associated output element.

10. A hydraulic power transmitter of the kind in which working liquid is circulated in a closed path of flow including a pump having an impeller for circulating the working liquid, a power input element for driving said pump, a first turbine member for receiving liquid discharged from the pump and bladed to be rotated in the same direction as said impeller, a second turbine member for receiving liquid discharged from the first turbine member and bladed to be rotated in the opposite direction, a reaction absorbing abutment, a guide blade member having blades located to be passed by the working liquid after it passes said second turbine member and before it enters the inlet of said impeller, a connection between said guide blade member and said abutment for restraining the guide blade member against rotation in a direction opposite that of the impeller, a power output element, and an automatically releasable one-way driving connection between said second turbine member and said output element, said driving connection being constructed to transmit power from said second turbine member to said output element only in said opposite direction of rotation.

11. A hydraulic power transmitter of the kind in which working liquid is circulated in a closed path of flow including a pump having an impeller for circulating the working liquid, a power input element for driving said pump, two turbine members each having a power output element associated therewith, said turbine members being bladed to deliver power to their respectively associated output elements in opposite directions of rotation, an automatically releasable one-way driving connection between one of said turbine members and its associated output element, a reaction absorbing abutment, a guide blade member having blades located to be passed by the working liquid after it leaves the turbine blading constructed to rotate in a direction opposite that of the pump and before entering the inlet of said impeller, and an automatically releasable one-way connection between said guide blade member and said abutment, said releasable connection being constructed to permit the guide blade member to rotate in the same direction as the impeller and to restrain the guide blade member against rotation in the opposite direction.

12. A hydraulic power transmitter of the kind in which working liquid is circulated in a closed path of flow including a pump having an impeller for circulating the working liquid, a power input element for driving said pump, a first turbine member bladed to be rotated in the same direction as said impeller, a second turbine member bladed to be rotated in the opposite direction by liquid discharged from said first turbine member, a power output element, an automatically releasable one-way driving connection between said second turbine member and said output element, said driving connection being constructed to transmit power from said second turbine member to said output element only in said opposite direction of rotation, a reaction absorbing abutment, a guide blade member having blades located to be passed by the working liquid after it passes said second turbine member and before it enters the inlet of said impeller, and an automatically releasable one-way connection between said guide blade member and said abutment, said releasable connection being constructed to permit the guide blade member to rotate in the same direction as the impeller and to restrain the guide blade member against rotation in the opposite direction.

13. A hydraulic torque converter comprising a fluid containing circuit which consists of an impeller wheel, a pair of turbine wheels coaxially arranged with respect to each other and with respect to the impeller wheel, the blades of said turbine wheels being so arranged that the said turbine wheels rotate in opposite directions with respect to each other and a set of stationary blades arranged on the entrance side of said impeller wheel to receive the fluid discharged by said turbine wheels and to return it to said impeller wheel.

14. A torque multiplying hydraulic converter including pump means, turbine means providing separate turbine stages constructed to rotate in opposed directions and guide blade means, all of said means being located in a common working chamber in which the working liquid is circulated by the pump means in a closed path of flow, said turbine stages being arranged so that the working liquid is discharged from a turbine stage turning in the same direction as said pump means to a turbine stage turning in a direction opposite that of said pump means, and said guide blade means being arranged to receive the working liquid discharged from a turbine stage rotating in a direction opposite that of the pump means and to discharge the working liquid to the inlet of said pump means.

15. A torque multiplying hydraulic converter including pump means, turbine means providing separate turbine stages constructed to rotate in opposite directions and guide blade means, all of said means being located in a common working chamber in which the working liquid is circulated by the pump means in a closed path of flow, said path of flow comprising a first portion in which the flow is generally radially outward and a second portion in which the flow is generally radially inward, said pump means and a turbine stage constructed to rotate in the same direction as the pump means being located in said first portion of said path to be passed by the working liquid in the order named, and a turbine stage constructed to rotate in the opposite direction and said guide blade means being located in said second portion of said path to be passed by the working liquid in the order named.

16. A torque multiplying hydraulic converter of the kind in which working liquid is circulated in a closed working circuit comprising pump means, a first turbine member having a stage constructed to rotate in the same direction as said pump means and located to receive the discharge therefrom, a second turbine member having a stage constructed to rotate in a direction opposite that of said pump means and located to receive the working liquid discharged from the first mentioned turbine stage, and a guide blade stage located to receive the working liquid discharged from said second mentioned turbine stage and to deliver the working liquid to the inlet of said pump means, the turbine stage of said second turbine member being constructed to be shifted out of said circuit to change the converter from double rotation operation to single rotation operation.

17. A torque multiplying hydraulic converter of the kind in which working liquid is circulated in a closed working circuit comprising pump means, a first turbine member having a stage constructed to rotate in the same direction as said pump means and located to receive the discharge therefrom, a second turbine member having a stage constructed to rotate in a direction opposite that of said pump means and located to receive the working liquid discharged from the first mentioned turbine stage, a guide blade stage located to receive the working liquid discharged from said second mentioned turbine stage and to deliver the working liquid to the inlet of said pump means, the turbine stage of said second turbine member being constructed to be shifted out of said circuit to change the converter from double rotation operation to single rotation operation, and an automatically releasable one-way driving connection for transmitting power from said second turbine member to a driven element, whereby to permit said second turbine member to run idly or stop when withdrawn from said circuit.

18. In a hydraulic torque converter of the closed circuit type, pump means, turbine means constructed to rotate in the same direction as the pump means, turbine means constructed to rotate in a direction opposite that of the pump means, guide blade means, the second mentioned turbine means having blading shiftably mounted to be withdrawn from said circuit, means for withdrawing said shiftably mounted blading from the circuit to change operation of the converter from double rotation operation to single rotation operation, and an automatically releasable one-way clutch for permitting the withdrawn blading to turn freely in the same direction as said pump means or to come to rest.

19. A torque multiplying hydraulic converter of the kind in which working liquid is circulated in a closed working circuit comprising pump means, a first turbine member having a stage constructed to rotate in the same direction as said pump means and located to receive the discharge therefrom, a second turbine member having a stage constructed to rotate in a direction opposite that of said pump means and located to receive the working liquid discharged from the first mentioned turbine stage, a guide blade stage located to receive the working liquid discharged from said second mentioned turbine stage and to deliver the working liquid to the inlet of said pump means, the blades of said guide blade stage being pivotally mounted, and means for turning said blades whereby to alter the angle at which working liquid is delivered to the inlet of said pump means.

20. A torque multiplying hydraulic converter of the kind in which working liquid is circulated in a closed working circuit comprising pump means, a first turbine member having a stage constructed to rotate in the same direction as said pump means and located to receive the discharge therefrom, a second turbine member having a stage constructed to rotate in a direction opposite that of said pump means and located to receive the working liquid discharged from the first mentioned turbine stage, a guide blade stage located to receive the working liquid discharged from said second mentioned turbine stage and to deliver the working liquid to the inlet of said pump means, the turbine stage of said second turbine member being constructed to be shifted out of said circuit to change the converter from double rotation operation to single rotation operation, the blades of said guide blade stage being pivotally mounted, and means for turning said blades whereby to alter the angle at which working liquid is delivered to the inlet of said pump means.

21. In a hydraulic torque converter of the closed circuit type, pump means, adjustably mounted guide blade means located on the inlet side of said pump means for guiding the working liquid thereto, means for altering the position of said guide blade means to change the angle of entrance of the working liquid into said pump means, and separate turbine members having turbine stages constructed to rotate in opposite directions respectively, said turbine stages being located in said circuit between the discharge side of said pump means and the inlet side of said guide means.

22. In a hydraulic torque converter of the kind in which working liquid is circulated in a closed path of flow, a pump for circulating the liquid, a turbine member including a ring of blades shiftable into and out of said path of flow and parts relatively rotatable with respect to each other to shift said ring of blades, and means comprising planetary gearing between said parts and operable from the exterior of the converter for effecting relative rotation therebetween.

23. In a hydraulic torque converter of the kind in which working liquid is circulated in a closed path of flow, a pump for circulating the liquid, a turbine member comprising a turbine wheel having a sleeve, a ring of turbine blades carried by said wheel and axially shiftable with respect thereto into and out of said path of flow, and means for shifting said ring comprising a part relatively rotatable with respect to said wheel, a sleeve member connected to said part and coaxial with the sleeve portion of the turbine wheel, planetary gearing connecting said sleeves, and means operable from the exterior of the converter to adjust said planetary gearing to effect relative rotation between said sleeves.

24. In a hydraulic torque converter of the kind in which working liquid is circulated in a closed path of flow, a pump member for circulating the liquid, said pump member comprising a wheel portion and a central shaft portion, a ring of pump blades pivotally mounted on said wheel portion, means for adjusting the position of the blades comprising a part relatively rotatable with respect to the pump member and having a central sleeve portion around the shaft portion of the pump member, planetary gearing connecting said central shaft portion and said sleeve portion, and means operable from the exterior of the converter for adjusting said gearing to cause relative turning movement between the parts connected by the gearing.

25. In a hydraulic torque converter of the closed circuit type, a stationary casing, a pump wheel having a ring of impeller blades mounted thereon, and a turbine wheel having a row of turbine blades thereon located radially outwardly of said pump blades and adapted to receive the working liquid discharged from said pump blades and to be rotated in the same direction as the pump by said liquid, said turbine wheel including peripherally continuous portions extending radially inward from the turbine blades on either side of said pump wheel to at least substantially the radially inner portions of said pump blades.

26. In a hydraulic torque converter of the kind in which liquid is circulated in a closed path of flow, a casing, a pump member comprising a wheel portion carrying a ring of pump blades and a central shaft portion rotatably mounted in said casing, and a turbine member rotatably mounted in said casing having a wheel portion and a central sleeve portion around the shaft portion of the pump member, the wheel portion of the turbine member carrying a ring of turbine blades radially outwardly of the pump blades and positioned to receive the liquid as discharged from the pump blades, and said turbine member further having an inner ring member projecting inwardly from the ring of turbine blades at the side of the pump blades opposite the wheel portion of the pump member, whereby to provide an annular pocket between the wheel portion of the turbine member and said inner ring member for the reception of the ring of pump blades.

27. A torque multiplying hydraulic converter of the closed circuit type including in the working circuit a pump, a plurality of forwardly rotating turbine stages constructed to rotate in the same direction as the pump, at least one reversely rotating turbine stage constructed to rotate in a direction opposite that of the pump, and at least one guide stage located in the circuit to be acted on by the working fluid after it is discharged from the reversely rotating blading and before it enters the pump, said guide stage being restrained against rotation in the direction opposite that of said pump.

28. A torque multiplying hydraulic converter of the closed circuit type including in the working circuit a pump, a plurality of forwardly rotating turbine stages constructed to rotate in the same direction as the pump, at least one reversely rotating turbine stage constructed to rotate in a direction opposite that of the pump and located in the circuit between two forwardly rotating stages, and a guide stage located in the circuit between the last of the forwardly rotating turbine stages and the inlet side of the pump, said guide stage being restrained against rotation in the direction opposite that of said pump.

29. A torque multiplying hydraulic converter of the closed circuit type having a working circuit consisting of a pump, two forwardly rotating turbine stages constructed to rotate in the same direction as the pump, a reversely rotating turbine stage constructed to rotate in a direction opposite that of the pump and located between said two forwardly rotating stages, and a guide stage located in the circuit between the second of said forwardly rotating stages and the pump, said guide stage being restrained against rotation in the direction opposite that of said pump.

30. In a torque multiplying hydraulic converter of the type having a closed working circuit in which the flow of working liquid is substantially radially outward in a first portion of the circuit and substantially radially inward in a second portion of the circuit, including pump means located in said first portion of the circuit, a plurality of turbine stages including oppositely rotating stages located in said second portion of the circuit, and a guide blade stage located in said first portion of the circuit radially inwardly of said pump means and discharging thereto.

ALF LYSHOLM.